United States Patent
Nguyen et al.

(10) Patent No.: US 9,263,070 B1
(45) Date of Patent: Feb. 16, 2016

(54) ACTUATOR PIVOT ASSEMBLY INCLUDING A BONDING ADHESIVE BARRIER CONFIGURED TO REDUCE CONTAMINATION

(71) Applicant: Western Digital Technologies, Inc., Irvine, CA (US)

(72) Inventors: Daniel T. Nguyen, Milpitas, CA (US); Kevin R. Sill, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/534,014

(22) Filed: Nov. 5, 2014

(51) Int. Cl.
*G11B 5/48* (2006.01)
*G11B 33/14* (2006.01)

(52) U.S. Cl.
CPC .......... *G11B 5/4806* (2013.01); *G11B 5/4813* (2013.01); *G11B 33/1446* (2013.01)

(58) Field of Classification Search
USPC ............... 360/265.2–265.3, 265.6–265.7
See application file for complete search history.

(56) References Cited

U.S. PATENT DOCUMENTS

| | | | |
|---|---|---|---|
| 5,235,482 A | 8/1993 | Schmitz | |
| 6,046,889 A | 4/2000 | Berding et al. | |
| 6,052,890 A | 4/2000 | Malagrino, Jr. et al. | |
| 6,061,206 A | 5/2000 | Foisy et al. | |
| 6,101,876 A | 8/2000 | Brooks et al. | |
| 6,147,831 A | 11/2000 | Kennedy et al. | |
| 6,151,189 A | 11/2000 | Brooks | |
| 6,151,197 A | 11/2000 | Larson et al. | |
| 6,185,067 B1 | 2/2001 | Chamberlain | |
| 6,185,074 B1 | 2/2001 | Wang et al. | |
| 6,208,486 B1 | 3/2001 | Gustafson et al. | |
| 6,215,616 B1 | 4/2001 | Phan et al. | |
| 6,238,467 B1 | 5/2001 | Azarian et al. | |
| 6,272,694 B1 | 8/2001 | Knoth et al. | |
| 6,288,866 B1 | 9/2001 | Butler et al. | |
| 6,292,333 B1 | 9/2001 | Blumentritt et al. | |
| 6,343,721 B1 * | 2/2002 | Breault | 222/399 |
| 6,344,950 B1 | 2/2002 | Watson et al. | |
| 6,349,464 B1 | 2/2002 | Codilian et al. | |
| 6,388,873 B1 | 5/2002 | Brooks et al. | |
| 6,417,979 B1 | 7/2002 | Patton, III et al. | |
| 6,421,208 B1 | 7/2002 | Oveyssi | |
| 6,441,998 B1 | 8/2002 | Abrahamson | |
| 6,462,914 B1 | 10/2002 | Oveyssi et al. | |
| 6,466,398 B1 | 10/2002 | Butler et al. | |
| 6,469,871 B1 | 10/2002 | Wang | |
| 6,502,300 B1 | 1/2003 | Casey et al. | |
| 6,519,116 B1 | 2/2003 | Lin et al. | |
| 6,529,345 B1 | 3/2003 | Butler et al. | |
| 6,529,351 B1 | 3/2003 | Oveyssi et al. | |
| 6,535,358 B1 | 3/2003 | Hauert et al. | |
| 6,545,382 B1 | 4/2003 | Bennett | |
| 6,549,381 B1 | 4/2003 | Watson | |
| 6,560,065 B1 | 5/2003 | Yang et al. | |
| 6,571,460 B1 | 6/2003 | Casey et al. | |
| 6,574,073 B1 | 6/2003 | Hauert et al. | |
| 6,580,574 B1 | 6/2003 | Codilian | |
| 6,594,111 B1 | 7/2003 | Oveyssi et al. | |

(Continued)

*Primary Examiner* — Wayne Young
*Assistant Examiner* — Carlos E Garcia (57) ABSTRACT

One aspect of an actuator assembly configured for use in a disk drive includes an actuator body including a bore, an adhesive inlet port, and an adhesive vent, a pivot bearing disposed at least partially within the bore of the actuator body, an adhesive disposed between the pivot bearing and the actuator body, and a barrier coupled to the actuator body and positioned over the adhesive vent.

15 Claims, 4 Drawing Sheets

(56) References Cited

U.S. PATENT DOCUMENTS

| | | |
|---|---|---|
| 6,603,620 B1 | 8/2003 | Berding |
| 6,615,857 B1 * | 9/2003 | Sinha et al. ................. 137/14 |
| 6,618,222 B1 | 9/2003 | Watkins et al. |
| 6,624,966 B1 | 9/2003 | Ou-Yang et al. |
| 6,624,980 B1 | 9/2003 | Watson et al. |
| 6,624,983 B1 | 9/2003 | Berding |
| 6,628,473 B1 | 9/2003 | Codilian et al. |
| 6,654,200 B1 | 11/2003 | Alexander et al. |
| 6,657,811 B1 | 12/2003 | Codilian |
| 6,661,597 B1 | 12/2003 | Codilian et al. |
| 6,661,603 B1 | 12/2003 | Watkins et al. |
| 6,674,600 B1 | 1/2004 | Codilian et al. |
| 6,690,637 B1 | 2/2004 | Codilian |
| 6,693,767 B1 | 2/2004 | Butler |
| 6,693,773 B1 | 2/2004 | Sassine |
| 6,697,217 B1 | 2/2004 | Codilian |
| 6,698,286 B1 | 3/2004 | Little et al. |
| 6,700,736 B1 | 3/2004 | Wu et al. |
| 6,704,167 B1 | 3/2004 | Scura et al. |
| 6,707,637 B1 | 3/2004 | Codilian et al. |
| 6,707,641 B1 | 3/2004 | Oveyssi et al. |
| 6,710,980 B1 | 3/2004 | Hauert et al. |
| 6,710,981 B1 | 3/2004 | Oveyssi et al. |
| 6,728,062 B1 | 4/2004 | Ou-Yang et al. |
| 6,728,063 B1 | 4/2004 | Gustafson et al. |
| 6,731,470 B1 | 5/2004 | Oveyssi |
| 6,735,033 B1 | 5/2004 | Codilian et al. |
| 6,741,428 B1 | 5/2004 | Oveyssi |
| 6,751,051 B1 | 6/2004 | Garbarino |
| 6,754,042 B1 | 6/2004 | Chiou et al. |
| 6,757,132 B1 | 6/2004 | Watson et al. |
| 6,759,784 B1 | 7/2004 | Gustafson et al. |
| 6,781,780 B1 | 8/2004 | Codilian |
| 6,781,787 B1 | 8/2004 | Codilian et al. |
| 6,781,791 B1 | 8/2004 | Griffin et al. |
| 6,790,066 B1 | 9/2004 | Klein |
| 6,791,791 B1 | 9/2004 | Alfred et al. |
| 6,791,801 B1 | 9/2004 | Oveyssi |
| 6,795,262 B1 | 9/2004 | Codilian et al. |
| 6,798,603 B1 | 9/2004 | Singh et al. |
| 6,801,389 B1 | 10/2004 | Berding et al. |
| 6,801,404 B1 | 10/2004 | Oveyssi |
| 6,816,342 B1 | 11/2004 | Oveyssi |
| 6,816,343 B1 | 11/2004 | Oveyssi |
| 6,825,622 B1 | 11/2004 | Ryan et al. |
| 6,826,009 B1 | 11/2004 | Scura et al. |
| 6,831,810 B1 | 12/2004 | Butler et al. |
| 6,839,199 B1 | 1/2005 | Alexander, Jr. et al. |
| 6,844,996 B1 | 1/2005 | Berding et al. |
| 6,847,504 B1 | 1/2005 | Bennett et al. |
| 6,847,506 B1 | 1/2005 | Lin et al. |
| 6,856,491 B1 | 2/2005 | Oveyssi |
| 6,856,492 B2 | 2/2005 | Oveyssi |
| 6,862,154 B1 | 3/2005 | Subrahmanyam et al. |
| 6,862,156 B1 | 3/2005 | Lin et al. |
| 6,862,176 B1 | 3/2005 | Codilian et al. |
| 6,865,049 B1 | 3/2005 | Codilian et al. |
| 6,865,055 B1 | 3/2005 | Ou-Yang et al. |
| 6,867,946 B1 | 3/2005 | Berding et al. |
| 6,867,950 B1 | 3/2005 | Lin |
| 6,876,514 B1 | 4/2005 | Little |
| 6,879,466 B1 | 4/2005 | Oveyssi et al. |
| 6,888,697 B1 | 5/2005 | Oveyssi |
| 6,888,698 B1 | 5/2005 | Berding et al. |
| 6,891,696 B1 | 5/2005 | Ou-Yang et al. |
| 6,898,052 B1 | 5/2005 | Oveyssi |
| 6,900,961 B1 | 5/2005 | Butler |
| 6,906,880 B1 | 6/2005 | Codilian |
| 6,906,897 B1 | 6/2005 | Oveyssi |
| 6,908,330 B2 | 6/2005 | Garrett et al. |
| 6,922,308 B1 | 7/2005 | Butler |
| 6,930,848 B1 | 8/2005 | Codilian et al. |
| 6,930,857 B1 | 8/2005 | Lin et al. |
| 6,934,126 B1 | 8/2005 | Berding et al. |
| 6,937,444 B1 | 8/2005 | Oveyssi |
| 6,940,698 B2 | 9/2005 | Lin et al. |
| 6,941,642 B1 | 9/2005 | Subrahmanyam et al. |
| 6,947,251 B1 | 9/2005 | Oveyssi et al. |
| 6,950,275 B1 | 9/2005 | Ali et al. |
| 6,950,284 B1 | 9/2005 | Lin |
| 6,952,318 B1 | 10/2005 | Ngo |
| 6,954,329 B1 | 10/2005 | Ojeda et al. |
| 6,958,884 B1 | 10/2005 | Ojeda et al. |
| 6,958,890 B1 | 10/2005 | Lin et al. |
| 6,961,212 B1 | 11/2005 | Gustafson et al. |
| 6,961,218 B1 | 11/2005 | Lin et al. |
| 6,963,469 B1 | 11/2005 | Gustafson et al. |
| 6,965,500 B1 | 11/2005 | Hanna et al. |
| 6,967,800 B1 | 11/2005 | Chen et al. |
| 6,967,804 B1 | 11/2005 | Codilian |
| 6,970,329 B1 | 11/2005 | Oveyssi et al. |
| 6,972,924 B1 | 12/2005 | Chen et al. |
| 6,972,926 B1 | 12/2005 | Codilian |
| 6,975,476 B1 | 12/2005 | Berding |
| 6,979,931 B1 | 12/2005 | Gustafson et al. |
| 6,980,391 B1 | 12/2005 | Haro |
| 6,980,401 B1 | 12/2005 | Narayanan et al. |
| 6,982,853 B1 | 1/2006 | Oveyssi et al. |
| 6,989,953 B1 | 1/2006 | Codilian |
| 6,990,727 B1 | 1/2006 | Butler et al. |
| 6,996,893 B1 | 2/2006 | Ostrander et al. |
| 7,000,309 B1 | 2/2006 | Klassen et al. |
| 7,006,324 B1 | 2/2006 | Oveyssi et al. |
| 7,013,731 B1 | 3/2006 | Szeremeta et al. |
| 7,031,104 B1 | 4/2006 | Butt et al. |
| 7,035,053 B1 | 4/2006 | Oveyssi et al. |
| 7,050,270 B1 | 5/2006 | Oveyssi et al. |
| 7,057,852 B1 | 6/2006 | Butler et al. |
| 7,062,837 B1 | 6/2006 | Butler |
| 7,064,921 B1 | 6/2006 | Yang et al. |
| 7,064,922 B1 | 6/2006 | Alfred et al. |
| 7,064,932 B1 | 6/2006 | Lin et al. |
| 7,085,098 B1 | 8/2006 | Yang et al. |
| 7,085,108 B1 | 8/2006 | Oveyssi et al. |
| 7,092,216 B1 | 8/2006 | Chang et al. |
| 7,092,251 B1 | 8/2006 | Henry |
| 7,099,099 B1 | 8/2006 | Codilian et al. |
| 7,113,371 B1 | 9/2006 | Hanna et al. |
| 7,142,397 B1 | 11/2006 | Venk |
| 7,145,753 B1 | 12/2006 | Chang et al. |
| RE39,478 E | 1/2007 | Hatch et al. |
| 7,161,768 B1 | 1/2007 | Oveyssi |
| 7,161,769 B1 | 1/2007 | Chang et al. |
| 7,180,711 B1 | 2/2007 | Chang et al. |
| 7,193,819 B1 | 3/2007 | Chen et al. |
| 7,209,317 B1 | 4/2007 | Berding et al. |
| 7,209,319 B1 | 4/2007 | Watkins et al. |
| D542,289 S | 5/2007 | Diebel |
| 7,212,377 B1 | 5/2007 | Ou-Yang et |
| 7,215,513 B1 | 5/2007 | Chang et al. |
| 7,215,514 B1 | 5/2007 | Yang et al. |
| 7,224,551 B1 | 5/2007 | Ou-Yang et al. |
| D543,981 S | 6/2007 | Diebel |
| 7,227,725 B1 | 6/2007 | Chang et al. |
| 7,239,475 B1 | 7/2007 | Lin et al. |
| 7,271,978 B1 | 9/2007 | Santini et al. |
| 7,274,534 B1 | 9/2007 | Choy et al. |
| 7,280,311 B1 | 10/2007 | Ou-Yang et al. |
| 7,280,317 B1 | 10/2007 | Little et al. |
| 7,280,319 B1 | 10/2007 | McNab |
| 7,292,406 B1 | 11/2007 | Huang |
| 7,298,584 B1 | 11/2007 | Yamada et al. |
| 7,327,537 B1 | 2/2008 | Oveyssi |
| 7,339,268 B1 | 3/2008 | Ho et al. |
| 7,342,746 B1 | 3/2008 | Lin |
| RE40,203 E | 4/2008 | Hatch et al. |
| 7,353,524 B1 | 4/2008 | Lin et al. |
| 7,369,368 B1 | 5/2008 | Mohajerani |
| 7,372,670 B1 | 5/2008 | Oveyssi |
| 7,375,929 B1 | 5/2008 | Chang et al. |
| 7,379,266 B1 | 5/2008 | Ou-Yang et al. |
| 7,381,904 B1 | 6/2008 | Codilian |
| 7,385,784 B1 | 6/2008 | Berding et al. |
| 7,388,731 B1 | 6/2008 | Little et al. |

(56) References Cited

U.S. PATENT DOCUMENTS

| | | |
|---|---|---|
| 7,420,771 B1 | 9/2008 | Hanke et al. |
| 7,434,987 B1 | 10/2008 | Gustafson et al. |
| 7,436,625 B1 | 10/2008 | Chiou et al. |
| 7,440,234 B1 | 10/2008 | Cheng et al. |
| 7,477,488 B1 | 1/2009 | Zhang et al. |
| 7,477,489 B1 | 1/2009 | Chen et al. |
| 7,484,291 B1 | 2/2009 | Ostrander et al. |
| 7,505,231 B1 | 3/2009 | Golgolab et al. |
| 7,529,064 B1 | 5/2009 | Huang et al. |
| 7,538,981 B1 | 5/2009 | Pan |
| 7,561,374 B1 | 7/2009 | Codilian et al. |
| 7,567,410 B1 | 7/2009 | Zhang et al. |
| 7,576,955 B1 | 8/2009 | Yang et al. |
| 7,593,181 B1 | 9/2009 | Tsay et al. |
| 7,605,999 B1 | 10/2009 | Kung et al. |
| 7,609,486 B1 | 10/2009 | Little |
| 7,610,672 B1 | 11/2009 | Liebman |
| 7,633,721 B1 | 12/2009 | Little et al. |
| 7,633,722 B1 | 12/2009 | Larson et al. |
| 7,656,609 B1 | 2/2010 | Berding et al. |
| 7,660,075 B1 | 2/2010 | Lin et al. |
| 7,672,083 B1 | 3/2010 | Yu et al. |
| 7,684,155 B1 | 3/2010 | Huang et al. |
| 7,686,555 B1 | 3/2010 | Larson et al. |
| 7,709,078 B1 | 5/2010 | Sevier et al. |
| 7,715,149 B1 | 5/2010 | Liebman et al. |
| 7,729,091 B1 | 6/2010 | Huang et al. |
| 7,751,145 B1 | 7/2010 | Lin et al. |
| 7,826,177 B1 | 11/2010 | Zhang et al. |
| 7,852,601 B1 | 12/2010 | Little |
| 7,864,488 B1 | 1/2011 | Pan |
| 7,871,289 B2 | 1/2011 | Chin et al. |
| 7,898,770 B1 | 3/2011 | Zhang et al. |
| 7,903,369 B1 | 3/2011 | Codilian et al. |
| 7,903,377 B2 | 3/2011 | Huang et al. |
| 7,907,369 B1 | 3/2011 | Pan |
| 7,911,742 B1 | 3/2011 | Chang et al. |
| 7,926,167 B1 | 4/2011 | Liebman et al. |
| 7,952,837 B1 * | 5/2011 | Dobosz et al. ............. 360/265.4 |
| 7,957,095 B1 | 6/2011 | Tsay et al. |
| 7,957,102 B1 | 6/2011 | Watson et al. |
| 7,961,436 B1 | 6/2011 | Huang et al. |
| 8,004,782 B1 | 8/2011 | Nojaba et al. |
| 8,009,384 B1 | 8/2011 | Little |
| 8,018,687 B1 | 9/2011 | Little et al. |
| 8,031,431 B1 | 10/2011 | Berding et al. |
| 8,064,168 B1 | 11/2011 | Zhang et al. |
| 8,064,170 B1 | 11/2011 | Pan |
| 8,068,314 B1 | 11/2011 | Pan et al. |
| 8,081,401 B1 | 12/2011 | Huang et al. |
| 8,100,017 B1 | 1/2012 | Blick et al. |
| 8,116,038 B1 | 2/2012 | Zhang et al. |
| 8,125,740 B1 | 2/2012 | Yang et al. |
| 8,142,671 B1 | 3/2012 | Pan |
| 8,144,431 B2 | 3/2012 | Chang et al. |
| 8,144,434 B1 * | 3/2012 | Arnone et al. ............ 360/265.6 |
| 8,156,633 B1 | 4/2012 | Foisy |
| 8,159,785 B1 | 4/2012 | Lee et al. |
| 8,189,298 B1 | 5/2012 | Lee et al. |
| 8,194,348 B2 | 6/2012 | Jacoby et al. |
| 8,194,354 B1 | 6/2012 | Zhang et al. |
| 8,194,355 B1 | 6/2012 | Pan et al. |
| 8,203,806 B2 | 6/2012 | Larson et al. |
| 8,213,125 B2 * | 7/2012 | McCaslin et al. .......... 360/264.2 |
| 8,223,453 B1 | 7/2012 | Norton et al. |
| 8,228,631 B1 | 7/2012 | Tsay et al. |
| 8,233,239 B1 | 7/2012 | Teo et al. |
| 8,248,733 B1 | 8/2012 | Radavicius et al. |
| 8,259,417 B1 | 9/2012 | Ho et al. |
| 8,274,760 B1 | 9/2012 | Zhang et al. |
| 8,276,256 B1 | 10/2012 | Zhang et al. |
| 8,279,560 B1 | 10/2012 | Pan |
| 8,284,514 B1 | 10/2012 | Garbarino |
| 8,289,646 B1 | 10/2012 | Heo et al. |
| 8,300,352 B1 | 10/2012 | Larson et al. |
| 8,305,708 B2 | 11/2012 | Tacklind |
| 8,320,086 B1 | 11/2012 | Moradnouri et al. |
| 8,322,021 B1 | 12/2012 | Berding et al. |
| 8,345,387 B1 | 1/2013 | Nguyen |
| 8,363,351 B1 | 1/2013 | Little |
| 8,369,044 B2 | 2/2013 | Howie et al. |
| 8,411,389 B1 | 4/2013 | Tian et al. |
| 8,416,522 B1 | 4/2013 | Schott et al. |
| 8,416,534 B1 | 4/2013 | Heo et al. |
| 8,422,171 B1 | 4/2013 | Guerini |
| 8,422,175 B1 | 4/2013 | Oveyssi |
| 8,432,641 B1 | 4/2013 | Nguyen |
| 8,437,101 B1 | 5/2013 | German et al. |
| 8,438,721 B1 | 5/2013 | Sill |
| 8,446,688 B1 | 5/2013 | Quines et al. |
| 8,451,559 B1 | 5/2013 | Berding et al. |
| 8,467,153 B1 | 6/2013 | Pan et al. |
| 8,472,131 B1 | 6/2013 | Ou-Yang et al. |
| 8,477,460 B1 | 7/2013 | Liebman |
| 8,488,270 B2 | 7/2013 | Brause et al. |
| 8,488,280 B1 | 7/2013 | Myers et al. |
| 8,499,652 B1 | 8/2013 | Tran et al. |
| 8,514,514 B1 | 8/2013 | Berding et al. |
| 8,530,032 B1 | 9/2013 | Sevier et al. |
| 8,542,465 B2 | 9/2013 | Liu et al. |
| 8,547,664 B1 * | 10/2013 | Foisy et al. ................. 360/265.2 |
| 8,553,356 B1 | 10/2013 | Heo et al. |
| 8,553,366 B1 | 10/2013 | Hanke |
| 8,553,367 B1 | 10/2013 | Foisy et al. |
| 8,568,503 B2 | 10/2013 | Sasaki et al. |
| 8,616,900 B1 | 12/2013 | Lion |
| 8,665,555 B1 | 3/2014 | Young et al. |
| 8,667,667 B1 | 3/2014 | Nguyen et al. |
| 8,693,139 B2 | 4/2014 | Tian et al. |
| 8,693,140 B1 | 4/2014 | Weiher et al. |
| 8,699,179 B1 | 4/2014 | Golgolab et al. |
| 8,702,998 B1 | 4/2014 | Guerini |
| 8,705,201 B2 | 4/2014 | Casey et al. |
| 8,705,209 B2 | 4/2014 | Seymour et al. |
| 8,717,706 B1 | 5/2014 | German et al. |
| 8,743,509 B1 | 6/2014 | Heo et al. |
| 8,755,148 B1 | 6/2014 | Howie et al. |
| 8,756,776 B1 | 6/2014 | Chen et al. |
| 8,760,800 B1 | 6/2014 | Brown et al. |
| 8,760,814 B1 | 6/2014 | Pan et al. |
| 8,760,816 B1 | 6/2014 | Myers et al. |
| 8,773,812 B1 | 7/2014 | Gustafson et al. |
| 8,780,491 B1 | 7/2014 | Perlas et al. |
| 8,780,504 B1 | 7/2014 | Teo et al. |
| 8,792,205 B1 | 7/2014 | Boye-Doe et al. |
| 8,797,677 B2 | 8/2014 | Heo et al. |
| 8,797,689 B1 | 8/2014 | Pan et al. |
| 8,824,095 B1 | 9/2014 | Dougherty |
| 8,824,098 B1 | 9/2014 | Huang et al. |
| 2002/0006015 A1 * | 1/2002 | Mouri et al. ................ 360/265.2 |
| 2003/0077442 A1 | 4/2003 | Inokuchi et al. |
| 2004/0120079 A1 * | 6/2004 | Tsuchiya ................... 360/265.2 |
| 2008/0063329 A1 * | 3/2008 | Asano et al. ................. 384/428 |
| 2008/0229842 A1 | 9/2008 | Ohtsuka et al. |
| 2008/0247081 A1 * | 10/2008 | Chang et al. ................ 360/97.01 |
| 2008/0291574 A1 * | 11/2008 | Obara ........................... 360/224 |
| 2011/0212281 A1 | 9/2011 | Jacoby et al. |
| 2012/0270002 A1 | 10/2012 | Horiguchi et al. |
| 2013/0038964 A1 | 2/2013 | Garbarino et al. |
| 2013/0091698 A1 | 4/2013 | Banshak, Jr. et al. |
| 2013/0155546 A1 | 6/2013 | Heo et al. |
| 2013/0290988 A1 | 10/2013 | Watson et al. |

* cited by examiner

ACTUATOR PIVOT ASSEMBLY INCLUDING A BONDING ADHESIVE BARRIER CONFIGURED TO REDUCE CONTAMINATION

BACKGROUND

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write. For convenience, all heads that can read are referred to as "read heads" herein, regardless of other devices and functions the read head may also perform (e.g., writing, flying height control, touch down detection, lapping control, etc).

In a modern magnetic hard disk drive device, each read head is a sub-component of a head gimbal assembly (HGA). The read head typically includes a slider and a read/write transducer. The read/write transducer typically comprises a magneto-resistive read element (e.g., so-called giant magneto-resistive read element, or a tunneling magneto-resistive read element), and an inductive write structure comprising a flat coil deposited by photolithography, and a yoke structure having pole tips that face a disk media. The HGA typically also includes a suspension assembly that includes a mounting plate, a load beam, and a laminated flexure to carry the electrical signals to and from the read head. The read head is typically bonded to a tongue feature of the laminated flexure.

The HGA, in turn, can be a sub-component of a head stack assembly (HSA) that typically includes a plurality of HGAs, a head actuator, and a flex cable. The mounting plate of each suspension assembly can be attached to an arm of the head actuator (e.g. by swaging), and each of the laminated flexures can include a flexure tail that is electrically connected to the HSA's flex cable (e.g., by solder reflow bonding or ultrasonic bonding). The angular position of the HSA, and therefore the position of the read heads relative to data tracks on the disks, can be actively controlled by the head actuator which is typically driven by a voice coil motor (VCM). Specifically, electrical current passed through a coil of the VCM can apply a torque to the head actuator, so that the read head can seek and follow desired data tracks on the spinning disk.

The actuator body of the HSA can be pivotally attached to a base of the disk drive, for example, by a pivot bearing that allows the HSA to pivot. The pivot bearing typically is disposed within a bore formed in the actuator body and bonded thereto by a layer of adhesive. During manufacture a portion of the adhesive that can squeeze out of an adhesive vent in the actuator body into a space located between the actuator body and the flex stiffener. The thin layer of adhesive squeeze out does not get cured during the baking process after pivot adhesive dispensing, which can led to high liquid particle counts within the magnetic disk drive. Such high liquid particle count can thereby contaminate other disk drive components (e.g., the head or disk), reducing the reliability and/or lifetime of the disk drive and threatening the data stored within.

DETAILED DESCRIPTION

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention.

The word "exemplary" is used herein to mean serving as an example, instance, or illustration. Any embodiment described herein as "exemplary" is not necessarily to be construed as preferred or advantageous over other embodiments. Likewise, the term "embodiment" of a system or method does not require that all embodiments of the invention include the described components, structure, features, functionality, processes, advantages, benefits, or modes of operation.

In the following detailed description, various aspects of a substrate cleaning system will be presented. These aspects of a substrate cleaning system are well suited for cleaning of the media storage substrates and avoiding contamination of the media storage substrates during a cleaning and packaging process. Those skilled in the art will realize that these aspects may be extended to all types of media storage substrates storage disks such as optical disks, floppy disks, or any other suitable disk capable of storing data through various electronic, magnetic, optical, or mechanic changes to the surface of the disk. Moreover, aspects of the substrate cleaning system may be extended to processes involved in the cleaning of integrated circuits, displays, and other suitable apparatus, products, and articles of manufacture. Accordingly, any reference to a specific system or method is intended only to illustrate the various aspects of the present invention, with the understanding that such aspects may have a wide range of applications.

One aspect of an actuator assembly configured for use in a disk drive, the actuator assembly includes an actuator body including a bore, an adhesive inlet port, and an adhesive vent, a pivot bearing disposed at least partially within the bore of the actuator body, an adhesive disposed between the pivot bearing and the actuator body, and a barrier coupled to the actuator body and positioned over the adhesive vent.

One aspect of a disk drive including a disk drive base, a rotatable spindle coupled to the disk drive base, a recording media mounted on the rotatable spindle, and an actuator assembly pivotally coupled to the disk drive base, the head actuator comprising an actuator body including a bore, an adhesive inlet port, and an adhesive vent, a pivot bearing disposed at least partially within the bore of the actuator body, an adhesive disposed between the pivot bearing and the actuator body, and a barrier coupled to the actuator body and positioned over the adhesive vent.

One aspect of a method of manufacturing an actuator assembly includes coupling a barrier over an adhesive vent formed in an actuator body, positioning a pivot bearing within a bore formed in the actuator body, and introducing an adhesive into an adhesive inlet port formed in the actuator body.

It will be understood that other aspects of the present invention will become readily apparent to those skilled in the art from the following detailed description, wherein it is shown and described only several embodiments of the invention by way of illustration. As will be realized by those skilled in the art, the present invention is capable of other and different embodiments and its several details are capable of modification in various other respects, all without departing from the spirit and scope of the invention.

Figure 1:
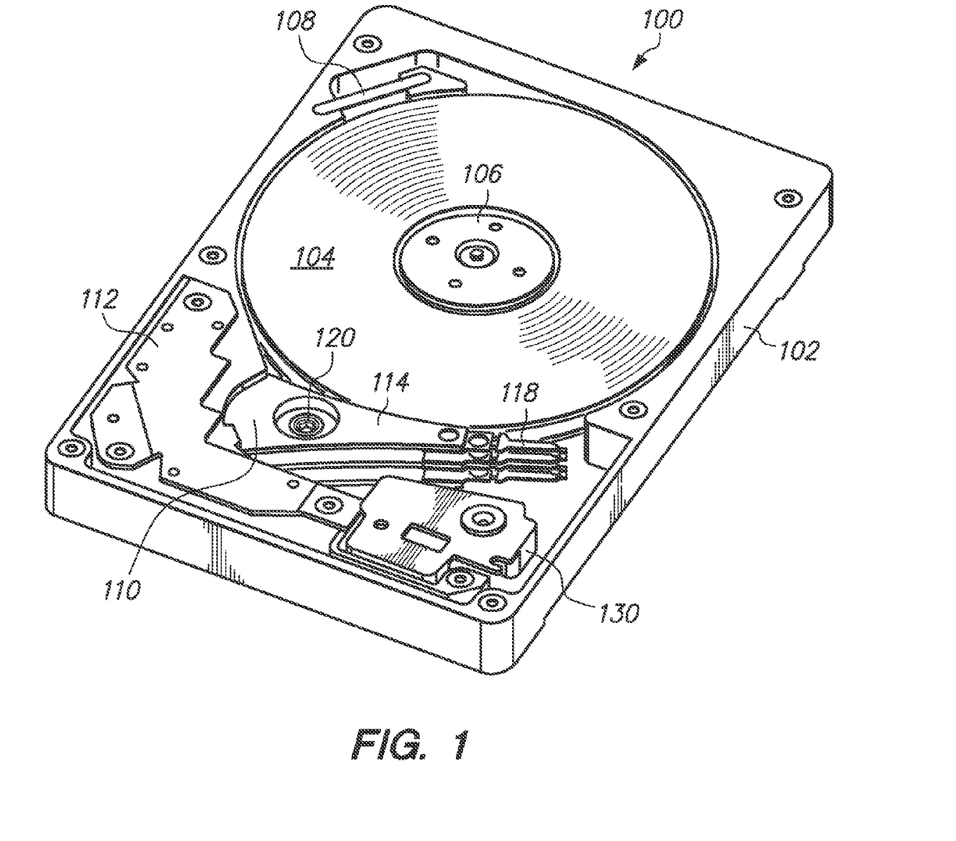
FIG. 1 is a diagram illustrating a top perceptive view of an exemplary embodiment of a disk drive.

FIG. 1 is top perspective view of an exemplary embodiment of a disk drive 100 with the disk drive cover removed to enable viewing of certain internal disk drive components. The disk drive 100 can include a disk drive base 102. The disk drive 100 can further include a spindle 106, rotatably mounted on the disk drive base 102, for rotating at least one disk 104 that is mounted on the spindle 106. In certain embodiments, the disk drive 100 may have only a single disk 104, or alternatively, two or more disks. The rotation of the disk(s) 104 can establish air flow through an optional recirculation filter 108. The disk drive 100 may optionally also include an absorbent filter 130 for helping to remove contaminants from the internal atmosphere within the disk drive, if and after such contaminants have entered the internal atmosphere within the disk drive.

With further reference to FIG. 1, the disk drive 100 can further includes a head actuator 110 that is pivotally mounted on disk drive base 102 by an actuator pivot bearing 120. The head actuator 110 may include a plurality of actuator arms (e.g., actuator arm 114), each supporting a head gimbal assembly (e.g. HGA 118). For example, the HGA 118 may be attached to a distal end of the actuator arm 114 by a process known as swaging. Preferably the disk drive 100 will include one HGA 118 per disk surface, but depopulated disk drives are also contemplated in which fewer HGAs are used. In FIG. 1, the HGAs 118 are shown demerged from the disk 104, so that the disks do not obscure the HGAs from view. In such position, the HGAs can be supported by a conventional head loading ramp (not shown in FIG. 1 so that the view of the HGAs will not be obstructed).

The distal end of the HGA 118 may include a read head (too small to be seen in the view of FIG. 1) for reading and writing data from and to a magnetic disk (e.g., disk 104). The read head may optionally include a ceramic slider substrate and a read/write transducer that may be an inductive magnetic write transducer merged with a magneto-resistive read transducer (e.g., a tunneling magneto-resistive read transducer). The head may also include other structures for performing other functions (e.g., writer, microactuator, heater, lapping guide, etc). Note also that in certain optical disk drives, it is possible for a read head to include an objective lens rather than a read transducer.

With further reference to FIG. 1, a magnet 112 may provide a magnetic field for a voice coil motor to pivot the head actuator 110 about the actuator pivot bearing 120 through a limited angular range, so that the read head of HGA 118 may be desirably positioned relative to one or more tracks of information on the disk 104.

Figure 2:
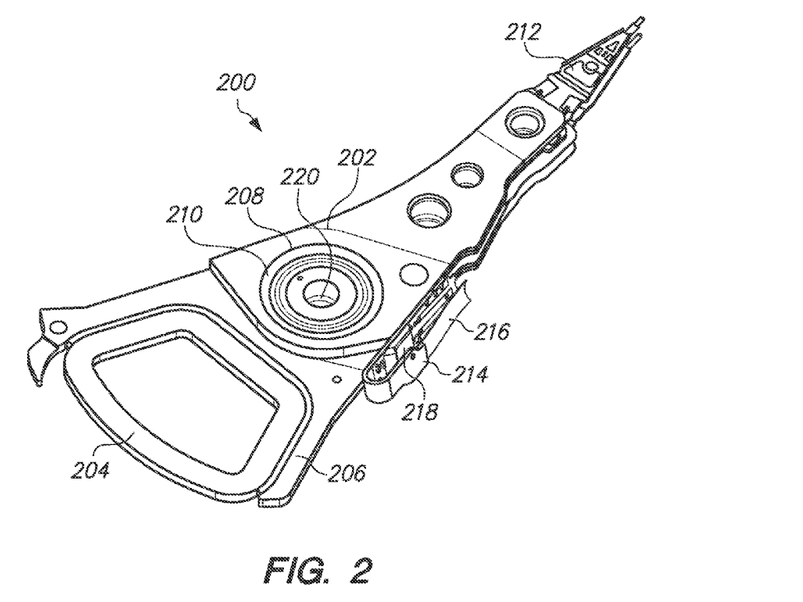
FIG. 2 is a diagram illustrating top perspective view of an exemplary embodiment of an actuator assembly.

FIG. 2 is a top perspective view of an exemplary embodiment of an actuator assembly 200. The actuator assembly 200 can include an actuator body 202. A head gimbal assembly (HGA) can extend from the actuator body 202 in a first direction. Furthermore, a voice coil support 206 and a voice coil 204 can extend from the actuator body 202 in a second direction that is approximately opposite the first direction. An electrical current driven through the voice coil 204 may interact with a magnetic field from a permanent magnet within the disk drive (e.g., magnet 112 of FIG. 1), to create a torque to pivot and control the angular position of the actuator assembly 200.

Referring to FIG. 2, the actuator body 202 can support a head gimbal assembly 212. Although the actuator assembly 200 is illustrated in FIG. 2 with a single actuator body 202, it is understood that the actuator assembly 200 may include a plurality of actuator bodies each supporting a head gimbal assembly without departing from the scope of the present disclosure. In an exemplary embodiment, the HGA 212 supports a read head. For example, the HGA 212 can include a flexure (not shown) that supports a read head (not shown) and that can include conductive traces to facilitate electrical connection to the read head. A terminal region of the flexure (not shown) may be electrically connected to a flex cable 216, which can run to an external connector (not shown), and upon which a pre-amplifier chip 218 may optionally be mounted. The flex cable 216 may include a flex stiffener 214 to help fix the flex cable 216 to the actuator body 202.

With reference to FIG. 2, the actuator body 202 can include a bore 208 therein, and an actuator pivot bearing 210 can be disposed at least partially within the bore 208. The actuator pivot bearing 210 may include an inner shaft 220 that is fixed to the disk drive base (e.g., disk drive base 102 of FIG. 1), and a rotatable outer portion that may be attached to the actuator body 202. For example, the actuator pivot bearing 210 may include a rotatable outer sleeve that is inserted into the bore 208 of the actuator body 202, and/or held in place within the bore 208 of the actuator body 202 by an adhesive layer disposed between the actuator pivot bearing 210 and an inner surface of the bore 208 of the actuator body 202.

Figure 3:
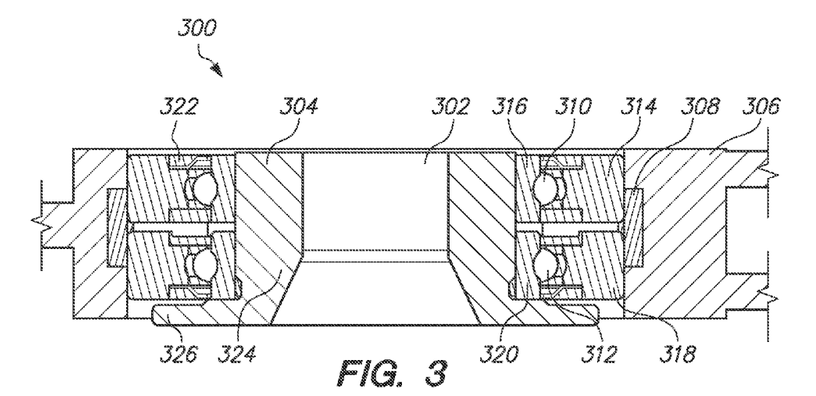
FIG. 3 is a diagram illustrating a cross-sectional view of an exemplary embodiment of an actuator pivot bearing bonded to an actuator body.

FIG. 3 illustrates a cross-sectional view of an exemplary embodiment of the actuator pivot bearing 300 bonded to the actuator body 306 with a layer of adhesive 308 disposed therebetween (e.g., as illustrated in FIG. 2). The actuator pivot bearing 300 can include a fixed inner bearing shaft 302, and a bearing cap (not shown) attached to an upper portion 304 of the fixed inner bearing shaft 302. A lower portion 324 of the fixed inner bearing shaft 302 has a bottom flange 326. In this context and as shown in FIG. 3, the bottom flange 326 is a location of substantially increased diameter along the fixed inner bearing shaft 302.

With reference to FIG. 3, the actuator pivot bearing 300 can also include an upper ball bearing 310, which can include an upper bearing inner race 316 and an upper bearing outer race 314, with a bearing shield 322 positioned therebetween. Furthermore, the actuator pivot bearing 300 can include a lower ball bearing 312, which may include a lower bearing inner race 320 and a lower bearing outer race 318. A lubricant can be used to wet at least one surface of the upper ball bearing 310 and/or the lower ball bearing 312. For example, oil and/or grease may be used to wet the surface of the upper bearing inner race 316, the upper bearing outer race 314, the lower bearing inner race 320, and/or the lower bearing outer race 318.

Figure 4:
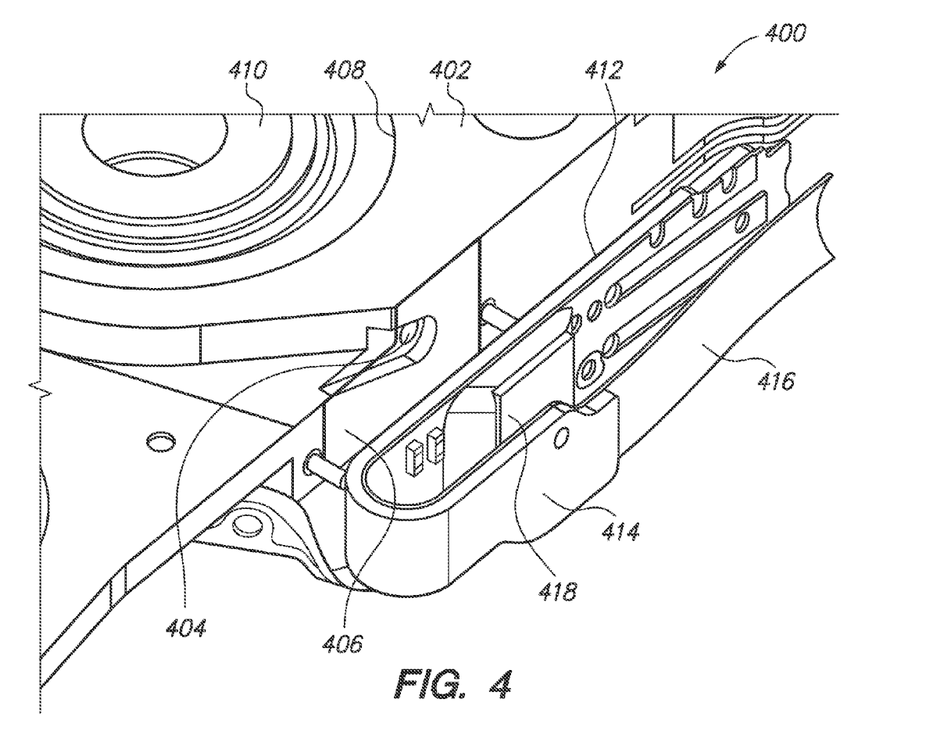
FIG. 4 is a diagram illustrating an exploded view of an exemplary embodiment of an actuator assembly including a barrier formed over an adhesive vent.

FIG. 4 illustrates an exploded view of an exemplary embodiment of an actuator assembly 400 including a barrier 406 coupled to an actuator body 402 and positioned over an adhesive vent 404. In accordance with an exemplary embodiment, the actuator body 402 can include an adhesive inlet port (not shown) into which an adhesive used to bond the pivot assembly 410 to an inner surface of the bore 408 in the actuator body 402 is introduced. An adhesive vent 404 formed in the actuator body 402 can be configured to allow an excess of adhesive to exit the actuator body 402 during a manufacturing process of the actuator assembly 400. The excess of adhesive that exits the adhesive vent can be used as an indicator that an appropriate amount of adhesive is bonded to the pivot bearing assembly 410 during the manufacturing of the actuator assembly 400.

The barrier 406 is illustrated in FIG. 4 as being coupled to the actuator body 402 and positioned over the adhesive vent 404. The barrier 406 can prevent the excess of adhesive that exits the adhesive vent 404 from squeezing into a small space 412 that is located between the actuator body 402 and the flex stiffener 414. The flex stiffener 414 is illustrated in FIG. 4 being removed from the actuator body 402 so as not to obscure the barrier 406 from view. Without the barrier 406, the adhesive may squeeze into the small space 412 located between the actuator body 402 and the flex stiffener 414. During a process to cure the adhesive, due to the thinness of the layer of adhesive squeeze out located in the small space 412, the adhesive particles in the small space 412 may not properly bind to one another and/or cure, which can lead to liquid, solid, and/or gaseous contaminants within the disk drive. These contaminants can thereby reduce the reliability and/or lifetime of the disk drive and threatening the data stored within.

By including the barrier 406 over the adhesive vent 404, the adhesive can be prevented from squeezing into the small space 412 such that the adhesive that exits the adhesive vent 404 is forced in a direction other than into the small space 412. This creates a thicker layer of adhesive, which can enable the adhesive particles to properly bind to one another and/or cure, thereby reducing the amount of liquid, solid, and/or gaseous contaminants in the disk drive. Thus, by using the barrier 406 to prevent the adhesive from squeezing into the small space 412 between the actuator body 42 and the flex stiffener 414, contamination of the disk drive components (e.g., the head or disk) can be prevented, and the reliability and/or lifetime of the disk drive may be increased.

Figure 5:
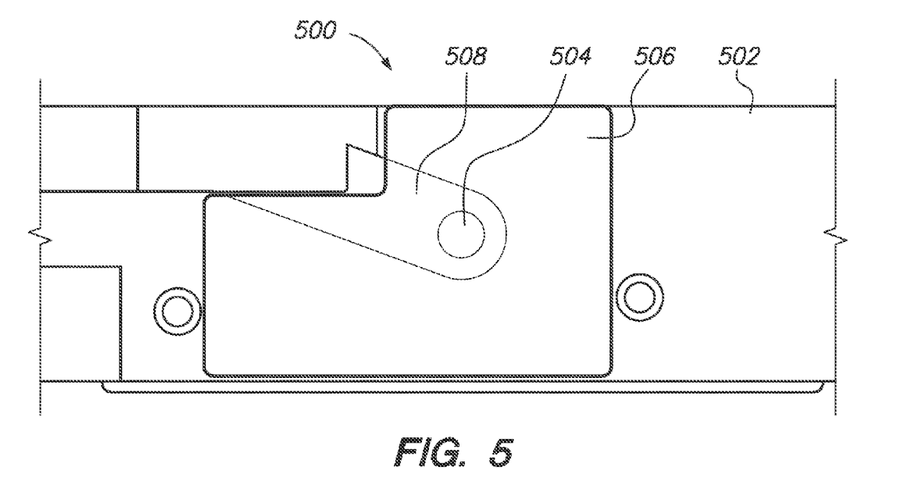
FIG. 5 is a diagram illustrating a side perspective view of an exemplary embodiment of a barrier formed over an adhesive vent.

FIG. 5 illustrates an exploded view of an exemplary embodiment of an actuator assembly 500 including a barrier 506 coupled to an actuator body 502 and positioned over an adhesive vent 504. Referring to FIG. 5, a barrier 506 can be disposed over an adhesive vent 504 which allows an excess of adhesive used to bond a pivot bearing (not shown in FIG. 5) to the actuator body 502 to exit the actuator body 502 and pool in region 508. An excess of adhesive that pools in region 508 of the actuator body 502 can be used as a visual indicator during the manufacturing of the actuator assembly 500 which indicates to an observer that an appropriate amount of adhesive was injected into the actuator body 502 to bond the pivot bearing (not shown in FIG. 5) to an inner surface of a bore (not shown in FIG. 5) formed in the actuator body 502. The barrier 506 can prevent adhesive that exits that adhesive vent 504 from squeezing into a small space 510 that is located between the actuator body 502 and a flex stiffener (not shown in FIG. 5).

Figure 6:
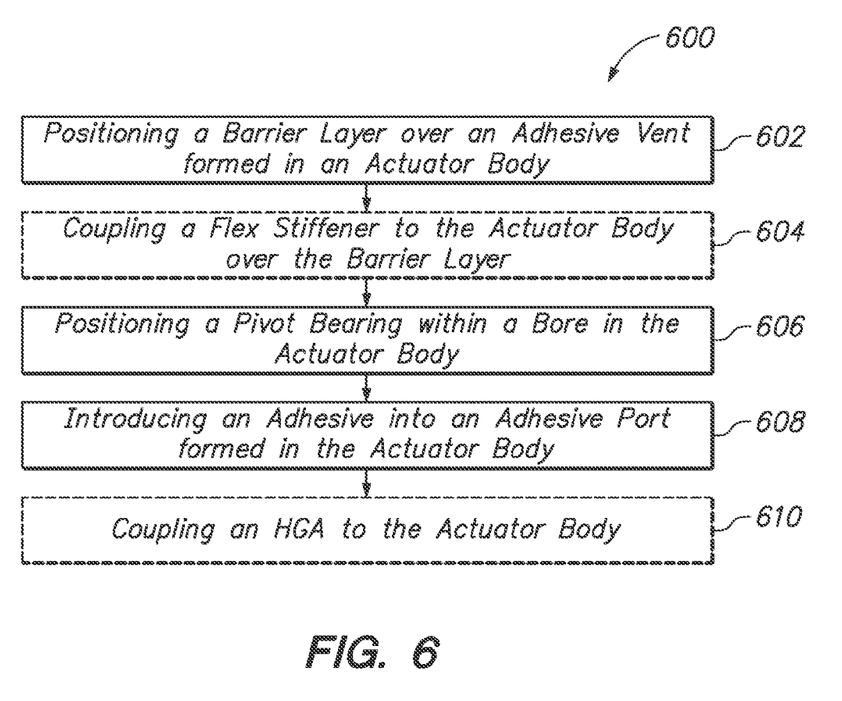
FIG. 6 is a flow chart illustrating an exemplary embodiment for manufacturing an actuator assembly.

FIG. 6 illustrates a flow chart for an exemplary embodiment of manufacturing 600 an actuator assembly 100 illustrated in FIG. 1. Each of the steps in the flow chart can be controlled using one or more processors of a computer system and/or by an automated robotic mechanism. As represented by block 602, a barrier can be positioned over an adhesive vent formed in an actuator body. For example, the barrier can include a pressure sensitive tape that adheres to an outer surface of the actuator body. According to an exemplary embodiment, a groove can be machined in the outer surface of the actuator body such that when the barrier is coupled thereto the barrier does not protrude from actuator body. Alternately, the barrier can be coupled to the outer surface of the actuator body such that the barrier protrudes from the actuator body. As represented by block 604, a flex stiffener can be coupled to the actuator body such that it is positioned over the barrier layer and the adhesive vent. As represented by block 606, a pivot bearing can be positioned within a bore formed in the actuator body. In an exemplary embodiment, the pivot bearing can include the pivot bearing 300 illustrated in FIG. 3. An adhesive can be introduced into an adhesive port formed in the actuator body, as represented by block 606. For example, the adhesive can fill a space located between the pivot bearing and a surface of the bore formed in the actuator body. An excess of the adhesive can exit the adhesive vent in the actuator body, and the barrier can prevent the adhesive from squeezing into a small space located between the actuator body and the flex stiffener. If required, the adhesive may be cured to form a bond between the pivot bearing and the actuator body, as represented by block 608. For example, the adhesive may require exposure to heat and/or ultraviolet radiation to form a bond between the pivot bearing and the actuator body. Alternately, the adhesive may form a bond when the adhesive dries without curing, in which case the curing step may be omitted. As represented by dashed block 610, an optional step of coupling an HGA to the actuator body can be performed. As such, an actuator assembly for use in a disk drive can be provided that can reduce a liquid particle count in the disk drive by ensuring that the adhesive that exits the adhesive vent is properly cured. Thus, contamination of the disk drive components (e.g., the head or disk) can be prevented, and the reliability and/or lifetime of the disk drive may be increased.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f) unless the element is expressly recited using the phrase "means for" or, in the case of a method claim, the element is recited using the phrase "step for."

What is claimed is:

1. An actuator assembly configured for use in a disk drive, the actuator assembly comprising:
    an actuator body including a bore, an adhesive inlet port, and an adhesive vent;
    a pivot bearing disposed at least partially within the bore of the actuator body;
    an adhesive disposed between the pivot bearing and the actuator body; and
    a barrier coupled to the actuator body and positioned over the adhesive vent;
        wherein the barrier comprises a pressure sensitive tape.

2. A method of manufacturing an actuator assembly, the method comprising:
- coupling a barrier over an adhesive vent formed in an actuator body;
- positioning a pivot bearing within a bore formed in the actuator body;
- introducing an adhesive into an adhesive inlet port formed in the actuator body; and
- coupling a flex stiffener to the actuator body by positioning the flex stiffener over the adhesive vent;
  - wherein the barrier comprises a pressure sensitive tape.

3. An actuator assembly configured for use in a disk drive, the actuator assembly comprising:
- an actuator body including a bore, an adhesive inlet port, and an adhesive vent;
- a pivot bearing disposed at least partially within the bore of the actuator body;
- an adhesive disposed between the pivot bearing and the actuator body;
- a barrier coupled to the actuator body and positioned over the adhesive vent;
- a flex stiffener coupled to the actuator body and positioned over the barrier; and
- a space located between the flex stiffener and the actuator body;
  - wherein the barrier is configured to prevent the adhesive from exiting the adhesive vent into the space located between the flex stiffener and the actuator body.

4. The actuator assembly of claim 3, further comprising:
- a suspension coupled to the actuator body; and
- a head gimbal assembly configured to access recording media.

5. The actuator assembly of claim 3, wherein the barrier is coupled to the actuator body such that an excess of the adhesive exits the adhesive vent in a direction other than into the space located between the flex stiffener and the actuator body.

6. The actuator assembly of claim 3, further comprising a flex cable coupled to the flex stiffener.

7. The actuator assembly of claim 6, further comprising a pre-amplifier coupled to the flex stiffener.

8. A method of manufacturing an actuator assembly, the method comprising:
- coupling a barrier over an adhesive vent formed in an actuator body;
- positioning a pivot bearing within a bore formed in the actuator body;
- introducing an adhesive into an adhesive inlet port formed in the actuator body; and
- coupling a flex stiffener to the actuator body such that the flex stiffener is positioned over the adhesive vent;
  - wherein the barrier is coupled over the adhesive vent to prevent the adhesive from exiting the adhesive vent into a space between the flex stiffener and the actuator body.

9. The method of claim 8, further comprising:
- coupling a suspension to the actuator body; and
- coupling a head gimbal assembly configured to access recording media.

10. The method of claim 8, wherein the barrier is coupled over the adhesive vent such that an excess of the adhesive exits the adhesive vent in a direction other than into the space located between the flex stiffener and the actuator body.

11. A disk drive, comprising:
- a disk drive base;
- a rotatable spindle coupled to the disk drive base;
- a recording media mounted on the rotatable spindle; and
- an actuator assembly pivotally coupled to the disk drive base, the actuator assembly comprising:
  - an actuator body including a bore, an adhesive inlet port, and an adhesive vent;
  - a pivot bearing disposed at least partially within the bore of the actuator body;
  - an adhesive disposed between the pivot bearing and the actuator body;
  - a barrier coupled to the actuator body and positioned over the adhesive vent;
  - a flex stiffener coupled to the actuator body and positioned over the barrier; and
  - a space located between the flex stiffener and the actuator body;
    - wherein the barrier is configured to prevent the adhesive from exiting the adhesive vent into the space located between the flex stiffener and the actuator body.

12. The disk drive of claim 11, wherein the actuator assembly further comprises:
- a suspension coupled to the actuator body; and
- a head gimbal assembly configured to access the recording media.

13. The disk drive of claim 11, wherein the barrier is coupled to the actuator body such that an excess of the adhesive exits the adhesive vent in a direction other than into the space located between the flex stiffener and the actuator body.

14. The disk drive of claim 11, further comprising:
- a flex cable coupled to the flex stiffener; and
- a pre-amplifier coupled to the flex stiffener.

15. A disk drive, comprising:
- a disk drive base;
- a rotatable spindle coupled to the disk drive base;
- a recording media mounted on the rotatable spindle; and
- an actuator assembly pivotally coupled to the disk drive base, the actuator assembly comprising:
  - an actuator body including a bore, an adhesive inlet port, and an adhesive vent;
  - a pivot bearing disposed at least partially within the bore of the actuator body;
  - an adhesive disposed between the pivot bearing and the actuator body; and
  - a barrier coupled to the actuator body and positioned over the adhesive vent;
    - wherein the barrier comprises a pressure sensitive tape.

* * * * *